United States Patent [19]

Pelzer

[11] Patent Number: 5,344,382
[45] Date of Patent: Sep. 6, 1994

[54] MULTI-CHAMBER CENTRIFUGE FOR DEGASSING OR GASSING OF LIQUIDS

[76] Inventor: Rudolf Pelzer, Auf der Pief 37, 5120 Herzogenrath, Fed. Rep. of Germany

[21] Appl. No.: 20,116

[22] Filed: Feb. 19, 1993

[51] Int. Cl.$^5$ .............................................. B04B 7/02
[52] U.S. Cl. ........................................ 494/60; 494/77; 96/216
[58] Field of Search ........................ 494/13, 14, 36, 43, 494/25, 26, 60, 74, 76, 78, 77, 44; 55/199, 203, 52

[56] References Cited

U.S. PATENT DOCUMENTS

| | | | |
|---|---|---|---|
| 866,844 | 9/1907 | Cottrell | 494/77 |
| 1,742,096 | 12/1929 | Perrier | 494/77 |
| 4,030,897 | 6/1977 | Pelzer | 55/203 |
| 4,113,452 | 9/1978 | Brown | 55/203 |

FOREIGN PATENT DOCUMENTS

| | | |
|---|---|---|
| 2552231 | 8/1976 | Fed. Rep. of Germany . |
| 2744261 | 4/1979 | Fed. Rep. of Germany . |
| 3700581 | 7/1988 | Fed. Rep. of Germany . |

OTHER PUBLICATIONS

Kleve von O. Moller, *Entgasung von Flussigkeiten im Fliehkraftfeld–Das Cedega–Verfahren*, Fat Sci. Technol. 90 Jahrgang, pp. 529–532, May 1988.
R. Pelzer and K. Bank, *Wissenschaftleche Forschungsarbeit, Synopse* 557, Chem.-Ing. Tech. 50, No. 1, pp. 58–59, 1978.
R. Pelzer and K. Lehrmann, *Entgasungszentrifuge*, CAV, pp. 39–41, Oct., 1984.
Cendega Construction, MCVC Brochure (undated).

*Primary Examiner*—Robert W. Jenkins
*Attorney, Agent, or Firm*—Davis Hoxie Faithfull & Hapgood

[57] ABSTRACT

In a multi-chamber centrifuge for gassing or degassing of liquids which has a floor 7, a corresponding lid 3 placed at a certain distance, with gaps to permit the passage of gas in the floor 7 and lid 3, with a liquid pipe connection in the lid 3 and two sets of coaxially mutually fitting cylinders, the set (=rotor) with the rotating cylinders rises from the floor 7, while the other set (=stator) descends from the lid 3 and is static. The cylinders of one set each penetrate the gaps between the cylinders of the other set, and each set of cylinders leaves a radial gap by reaching just short of the opposite base (either the floor 7 or the lid 3). At least some of the cylinders of the rotating set can be made at least partially of a woven material which can be fashioned like a sieve. On the static cylinders 4, vibration generators 19 and/or heating devices 13 may be installed (FIG. 1).

19 Claims, 3 Drawing Sheets

MULTI-CHAMBER CENTRIFUGE FOR DEGASSING OR GASSING OF LIQUIDS

SUMMARY OF THE INVENTION

The invention concerns a multi-chamber centrifuge for gassing or degassing liquids with a bottom, a lid fitted to it at a distance, gas vents in bottom and lid, a liquid connector in the lid and two sets of coaxially, mutually fitting cylinders, of which one set (the rotor) is supported to rotate, coupled with a drive and attached to the bottom, while the other set proceeds from the lid, and the cylinders of one set reach into the spaces between the cylinders of the other set, and vice versa, and reach up to a radial gap over the bottom and under the lid.

In processing one frequently has to degas liquids, to remove dissolved or undissolved (bubble) gases or to gas a liquid to a specific degree. In both situations the liquid should be distributed to a fine layer, i.e. it should be given the greatest possible surface. While degassing, the thin film is exposed to a vacuum; while gassing or aerating to a gas atmosphere. The molecules of the gas atmosphere diffuse into the liquid.

Both with gassing and degassing the intensity of the materials exchange depends on the magnitude of the exposed surface of the liquid and on the length of time the thin film is exposed.

One multi-chamber centrifuge exists already (DE 37 00 581 C2) which has a rotor which consists of multiple coaxial sheet metal cylinders which are smooth-walled and of stepwise graduated diameter, and are fixed to a rotor. One-half of these sheet metal cylinders is attached to the lid, the other half is attached to the floor of the rotor. The sets of cylinders intertwine and reach almost to the bottom and the lid, respectively.

The liquid to be gassed or degassed is fed centrally into the rotor. Beginning with the innermost cylinder, it overflows the inner surfaces of the cylinders up and then down, and then up again. That causes fast flowing thin films to form on the surfaces of the cylinders, flowing in axial direction, with a force that depends on rotational frequency of the rotor, cylinder diameter, and throughput of the liquid. At the transition point from one cylinder to the next the liquid film breaks, that the liquid flies in droplets through the reaction space until it hits the next cylinder surface. Finally, from the outer cylinder the droplets fly onto the surface of the fixed housing, merge into a thin film and flow with decreasing speed downwards spirally into the centrifuge sump.

In that existing centrifuge the liquid experiences an increase circumferential velocity with each transition from one cylinder to the next, which also causes an increase in the axial flow velocity on the surface of the cylinder. This increase of flow speed causes a reduced duration of exposure of the liquid in the reaction space.

The objective of the current invention is to develop the centrifuge described at the beginning in such a manner that the exposure time of the thin film increases during the materials exchange phase and construction of the equipment is simplified.

This objective is attained by fixing the set of cylinders originating from the lid in place (making it static).

When the liquid crosses from a rotating cylinder to the next static one, a spiral axially flowing thin film forms on the static cylinder, whose speed is braked by friction with the wall. The result is an increase in the time of stay of the thin film on this cylinder, and thereby a considerable increase of exposure time of the liquid thin film in the reaction space.

The radial distances between the rotating and static cylinders are picked, especially with gassing and degassing processes, according to what is to be accomplished. For example, the radial separation distances can be made to increase or decrease stepwise. Behind this is the physical goal of achieving a higher striking energy by means of greater radial distance between the cylinders, and thereby reaching a better degassing of the tossed droplets. On the other hand, with shorter radial distances the goal is to retain a greater portion of rotational movement energy. The rotating cylinders' function is primarily to speed up the rotation of the liquid again.

The multi-chamber centrifuge according to this invention can be made in such a way, that at least a part of the cylinders at least of the set attached to the bottom is at least partly made of a woven material. The woven material cylinders are flexible and are not round when at rest. They round out perfectly, however, when subjected to rotation. The preferred construction of the woven material is with metal threads.

According to a further proposition of the invention the woven material is to be constructed like a sieve. One can select the mesh size for a particular liquid in such a way, for example, that the thin film streaming across the woven cylinder decreases steadily in the direction of flow, because a part cf the liquid goes through the meshes, is torn to droplets, and hits the following cylinder with great force. This leads to a considerable increase of the exposed surface of liquid in the reaction space, and thereby an improvement of the degassing effect.

The multi-chamber centrifuge according to this invention can also be made in such a way that the woven material is liquid and gas permeable. This has the effect of increasing the surface roughness, braking the movement of the thin film and lengthening the time of exposure.

The multi-chamber centrifuge according to this invention can further be made in such a way that at least some cylinders of at least one set is touched by vibrators. The vibrators sit on the outer surface of the cylinders, excite corresponding vibrations and thereby additionally improve degassing of the fluid flowing across.

Preferably the vibrators are fashioned as ultrasound generators, and rest on the fixed cylinders.

The multi-chamber centrifuge according to this invention can further be made in such a way that at least some cylinders of the fixed set are provided with electrical resistance heating. That way the material exchange can be closely controlled by the desired warming of the liquid. The necessary energy introduction into the fixed cylinders is easy from a construction point of view.

Lastly, the multi-chamber centrifuge according to this invention can be made in such a way that at least some cylinders of the fixed set are steam heated.

For a specified gassing of liquid, the loaded gas can be conducted through the rotor and exhausted at the lid, moving from bottom to top in a turbulent manner with a mixture of crossflows, counterflows and continuous streams. This streaming path is made possible through openings in bottom and lid of the rotor housing, as described in DE 37 00 581 C2.

DETAILED DESCRIPTION

Figure 1:
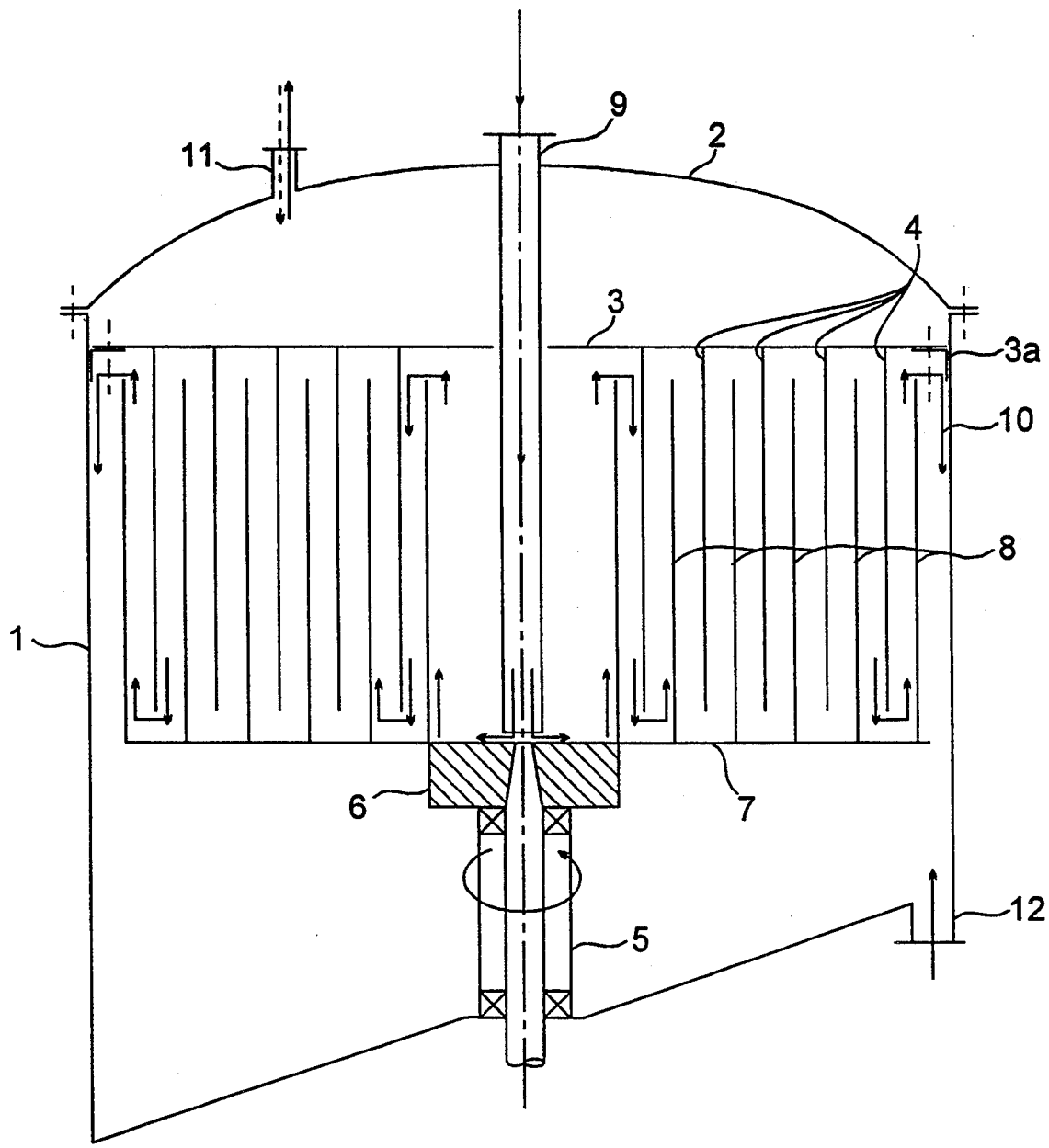
FIG. 1 Axial section through the first model of the invention.

The construction of the multi-chamber centrifuge according to this invention, according to FIG. 1, shows a housing 1, that is closed off by means of a hood 2. Inside the housing, near the upper edge, a lid 3 rests on support angles 3a, and concentrically arranged cylinders 4 are connected with it.

A drive shaft 5 reaches into the housing 1, and bears a hub part 6 at its upper end. On the hub part 6 rests the floor 7, and this, in turn, has the lower edges of six cylinders 8 affixed to it. The cylinders 8 reach into the fixed cylinders 4 like a comb, and are concentric with them.

A supply pipe 9 passes through the hood 2 and lid 3 and it ends close to the hub part 6. Through this supply pipe 9 the liquid to be gassed or degassed is introduced in the direction of the arrow. The liquid leaves the pipe at its lower end, exits radially outward and reaches the inner surface of cylinder 8, the one with the smallest diameter. But because the cylinders 8 are driven by drive shaft 5, hub part 6 and floor 7, centrifugal force acts upon liquid that appears on the inner surface of the cylinder, distributes the liquid over the height of cylinder 8 and gives it a corresponding circumferential velocity. First a thin film is formed on the inner cylinder 8. At the upper end this film tears and goes over to the next fixed cylinder 4. The rotational movement of the transited liquid is braked by the adjacent surface of the fixed cylinder. It leaves the fixed cylinder 4 at its lower edge, having undergone a longer exposure time because of the reduced rotary velocity, and crosses to the next cylinder 8 in outward radial order. The liquid is put through all the chambers and finally leaves the inner surface of the farthest outward cylinder 8, and crosses to the inner wall of the housing 1, where the liquid runs off in the direction of the arrow 10.

The gas freed by the degassing process can be drawn off through a vent 11. In the case of gassing of the input liquid, the loaded gas can be introduced through vent 11 and/or 12.

Figure 2:
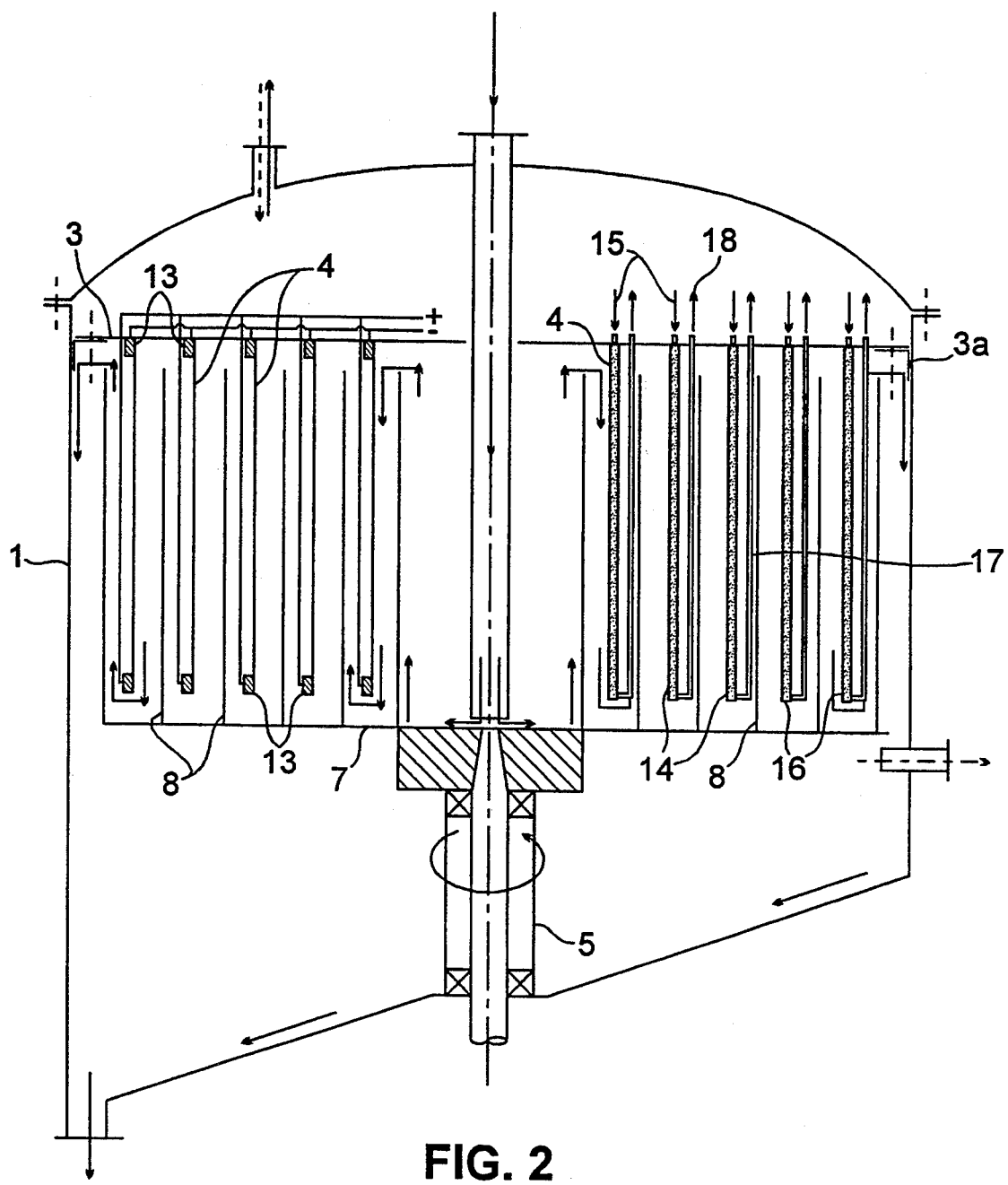
FIG. 2 Partial axial section, in which the fixed cylinders are heated by resistance heat (left part of figure) and by steam (right part of figure).

FIG. 2 shows electric resistance heaters on the left for the fixed cylinders 4. For that purpose, connector brackets 13 are provided at the upper and lower edges of the cylinders 4. The electrical supply passes through the lid 3. Since the lid 3 and the connected cylinders 4 are static, the power supply is easily accomplished, The cylinders 8, attached to floor 7 are constructed as shown in FIG. 1.

In FIG. 2 the steam heating of the fixed cylinders is shown on the right. That requires the cylinders 4 to be constructed as double walled 14. Steam is introduced in the direction of the arrows 15, and it condenses in the hollow cylinder heating chamber. The condensate 16 is drawn off through conduits 17 in the direction of the arrows 18. The cylinders 8, on the other hand, which are coupled with the drive shaft 5, remain unchanged from what is shown in FIG. 1.

Because of the fixed construction of the cylinders 4,14, the supplying of steam and the disposal of condensate is accomplished by means that are, construction-wise, simple.

Figure 3:
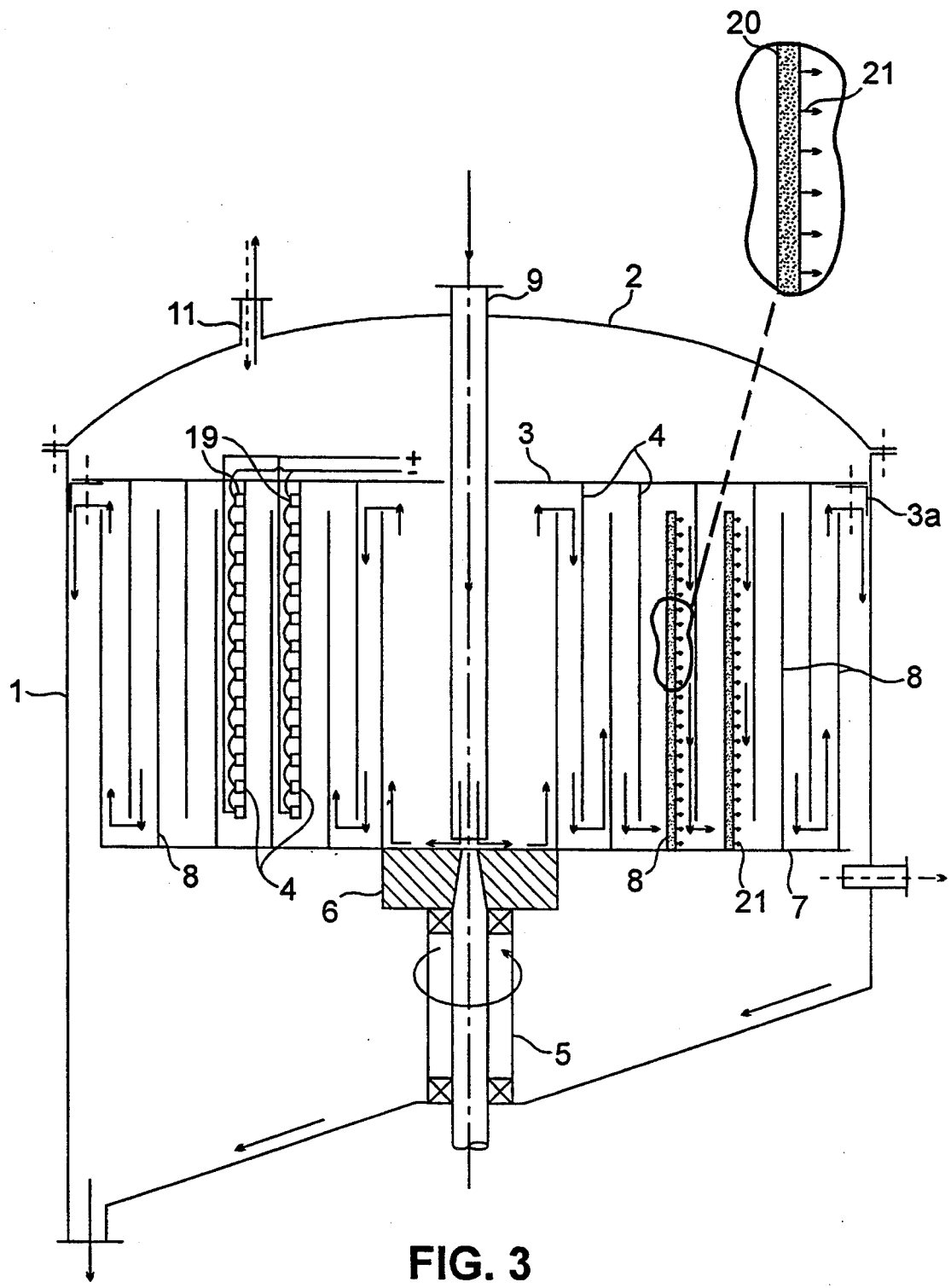
FIG. 3 Similar to FIG. 2, but the fixed cylinders have vibrators on the outside (left part of figure) or are fitted with radially permeable woven material (right part of figure).

According to the diagram in the left part of FIG. 3, vibrators 19 are placed on the outer surfaces of the fixed cylinders 4, and are connected to a power supply. These vibrators 19 can cover the entire outer surface of a fixed cylinder 4 in an equidistant arrangement. It is also possible to arrange the vibrators 19 in axial or spiral rows. The thin film traversing the inside surface of the same cylinder will pass over those formations of vibrators on the outside of the cylinder.

FIG. 3 shows, on the right, cylinders 8 which are connected to the floor 7 and rotate with it, and are made of a sieve-like woven material made of metal thread. That causes a part of the liquid, on its way across the inner surface of such a cylinder 8 to penetrate the woven material and hit the next fixed cylinder 4 in the form of droplets. The liquid droplets leave cylinder 8 in the direction of the arrows 21, as the detailed view at the bottom right on FIG. 3 shows.

The thickness of the thin film decreases on the cylinder 8 with upward movement, The mesh width of the woven material 20 of cylinder 8 can be selected according to requirements.

It is also possible to make the woven material impermeable to gas and liquid, and to use the woven material only for the purpose of making the surface rougher, thereby reducing the flow velocity and increasing the time of exposure.

The constructions dealing with heating and generating vibrations in the static cylinders, as well as the fabrication of the rotating cylinder 8 of woven material 20, as shown in FIG. 2 and FIG. 3, may be combined in accordance with any particular requirement. It may even make sense to furnish some of the static or rotating cylinders according to the above methods.

I claim:

1. A centrifuge for gassing or degassing liquids comprising:
   a housing;
   a lid fixedly mounted to the housing;
   at least one stator fixedly mounted to the lid and depending downwardly therefrom;
   a shaft capable of rotation disposed in the housing;
   a floor mounted to the shaft end disposed beneath the stator; and
   at least one rotor having an inner face and an outer face mounted to the floor and extending upwardly therefrom such that the rotor is disposed adjacent to the stator.

2. The centrifuge of claim 1 further comprising a heating means operatively engaged to at least one stator for heating the stator.

3. The centrifuge of claim 2 wherein the heating means comprises an electrical resistance heater.

4. The centrifuge of claim 2 wherein at least one stator is double-walled and the heating means is disposed within the stator double wall.

5. The centrifuge of claim 1 further comprising a set of stators wherein the stators are coaxially arranged cylinders and further comprising a set of rotors wherein the rotors are coaxially arranged cylinders.

6. The centrifuge of claim 1 wherein the inner face of the rotor has a rough surface for retarding the flow of liquid.

7. The centrifuge of claim 1 wherein at least one rotor comprises a woven material which is, at least in part, liquid permeable such that the liquid to be gassed or degassed flows, at least in part, through the rotor.

8. The centrifuge of claim 1 wherein in at least one stator comprises a woven material which is, at least in part, liquid permeable such that the liquid to be gassed or degassed flows, at least in part, through the stator.

9. The centrifuge of claim 1 further comprising at least one vibrator operatively engaged to at least one stator for vibrating the stator.

10. A centrifuge for gassing or degassing liquids comprising:
   a housing having a top and a bottom wherein the housing has at least one opening for the transmission of gas;
   a lid mounted on the housing;
   at least one top cylinder mounted to the lid and depending downwardly therefrom;
   a shaft disposed in the housing;
   a floor mounted to the shaft and disposed beneath the top cylinder;
   at least one rotor mounted to the floor and extending upwardly therefrom such that the rotor is disposed adjacent to the top cylinder;
   heating means operatively engaged to at least one top cylinder for heating the top cylinder; and
   a liquid supply pipe having an outlet for introducing liquid into the housing wherein the outlet is disposed within the rotor.

11. The centrifuge of claim 10 wherein the heating means comprises an electrical resistance heater.

12. The centrifuge of claim 10 wherein the top cylinder contains an inner chamber and the heating means comprises steam injected into the chamber.

13. The centrifuge of claim 10 wherein at least one rotor has a rough surface for retarding the flow of liquid.

14. The centrifuge of claim 10 wherein the rotor comprises a woven material which is, at least in part, liquid permeable such that liquid flows, at least in part, through the woven material.

15. The centrifuge of claim 10 further comprising a vibrating means operatively engaged to at least one top cylinder for vibrating the top cylinder.

16. The centrifuge of claim 15 wherein the vibrating means comprises an ultrasound generator.

17. A method of degassing or gassing liquids in a housing having stators fixedly mounted to the housing and cylindrical rotors disposed adjacent to the stators comprising the steps of:
   introducing the liquid into the housing wherein the housing is at a controlled pressure;
   injecting the liquid into the center of the rotors;
   rotating the rotors with respect to the housing such that the liquid travels up a surface of the rotor and passes over the rotor to the adjacent stator, wherein the liquid then flows down to a floor, and up the next rotating rotor;
   retaining the stators in a fixed position with respect to the housing; and
   transporting the liquid out of the housing.

18. The method of claim 13, further comprising the step of heating the stators.

19. The method of claim 17 wherein the step of heating the stators comprises the step of injecting steam into a chamber in at least one stator.

* * * * *